US009896943B2

(12) United States Patent
Crosatti et al.

(10) Patent No.: US 9,896,943 B2
(45) Date of Patent: Feb. 20, 2018

(54) GAS PATH COMPONENTS OF GAS TURBINE ENGINES AND METHODS FOR COOLING THE SAME USING POROUS MEDIUM COOLING SYSTEMS

(71) Applicant: HONEYWELL INTERNATIONAL INC., Morristown, NJ (US)

(72) Inventors: Lorenzo Crosatti, Phoenix, AZ (US); Shezan Kanjiyani, Glendale, AZ (US); Don Mittendorf, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 486 days.

(21) Appl. No.: 14/275,012

(22) Filed: May 12, 2014

(65) Prior Publication Data
US 2015/0322800 A1    Nov. 12, 2015

(51) Int. Cl.
*F01D 5/18*    (2006.01)
*F01D 5/14*    (2006.01)
(Continued)

(52) U.S. Cl.
CPC ............ *F01D 5/189* (2013.01); *B22F 3/1055* (2013.01); *B22F 5/009* (2013.01); *B22F 5/04* (2013.01); *B22F 7/004* (2013.01); *F01D 5/147* (2013.01); *F01D 5/183* (2013.01); *F01D 5/186* (2013.01); *F01D 5/188* (2013.01); *F05D 2260/202* (2013.01); *F05D 2260/203* (2013.01);
(Continued)

(58) Field of Classification Search
CPC .......... F01D 5/183; F01D 5/188; F01D 5/189; Y02T 50/676

USPC .......................................................... 416/95
See application file for complete search history.

(56) References Cited

U.S. PATENT DOCUMENTS 3,726,604 A * 4/1973 Helms ................... F01D 5/184
                                                    415/115
3,806,276 A * 4/1974 Aspinwall ............. F01D 5/189
                                                    415/115
(Continued)

FOREIGN PATENT DOCUMENTS

EP         1245786 B1    9/2005

OTHER PUBLICATIONS

Carbajal, G. et al.; Experimental Study of an Airfoil Heat Pipe Subjected to an Impingement of Hot Gases; Proceedings of the ASME 2012 International Mechanical Engineering Congress & Exposition, IMECE2012, Nov. 9-15, 2012, Houston, TX, USA.

*Primary Examiner* — Michael R Reid
*Assistant Examiner* — Christopher Ballman
(74) *Attorney, Agent, or Firm* — Lorenz & Kopf, LLP

(57) ABSTRACT

Gas path components of gas turbine engines and methods for cooling the same using porous medium cooling systems are provided. The gas path component comprises a wall at least partially defining a cooling plenum and a porous medium cooling system. The wall includes a wall surface comprising a gas path surface and an opposing wall surface proximate the cooling plenum. The porous medium cooling system is disposed between the cooling plenum and the opposing wall surface. The porous medium cooling system comprises a perforated baffle and a porous material layer disposed between and adjacent the perforated baffle and the opposing wall surface. The wall includes a plurality of openings in fluid communication with the cooling plenum via the porous medium cooling system.

4 Claims, 5 Drawing Sheets

(51) Int. Cl.
*B22F 5/04* (2006.01)
*B22F 3/105* (2006.01)
*B22F 5/00* (2006.01)
*B22F 7/00* (2006.01)

(52) U.S. Cl.
CPC ............ *Y02P 10/295* (2015.11); *Y02T 50/676* (2013.01); *Y10T 29/49321* (2015.01)

(56) References Cited

U.S. PATENT DOCUMENTS

| | | | | |
|---|---|---|---|---|
| 3,902,820 A * | 9/1975 | Amos | ............... | F01D 5/189 416/191 |
| 3,963,368 A * | 6/1976 | Emmerson | ............... | F01D 5/184 415/115 |
| 6,135,715 A * | 10/2000 | Correia | ............... | F01D 5/20 415/115 |
| 6,499,949 B2 * | 12/2002 | Schafrik | ............... | F01D 5/187 29/889.2 |
| 7,422,417 B2 * | 9/2008 | Landis | ............... | F01D 5/183 416/1 |
| 7,452,189 B2 * | 11/2008 | Shi | ............... | F01D 5/147 415/200 |
| 7,500,828 B2 | 3/2009 | Landis | | |
| 8,342,797 B2 * | 1/2013 | Kwon | ............... | F01D 5/186 415/115 |
| 9,732,617 B2 * | 8/2017 | Wang | ............... | F01D 5/186 |
| 2009/0193657 A1 * | 8/2009 | Wilson, Jr. | ............... | F01D 5/147 29/889.721 |
| 2010/0129217 A1 * | 5/2010 | Cherolis | ............... | B22C 7/02 416/91 |
| 2010/0239412 A1 * | 9/2010 | Draper | ............... | F01D 5/186 415/115 |
| 2011/0311389 A1 * | 12/2011 | Ryan | ............... | B22F 3/1055 419/27 |
| 2013/0094971 A1 * | 4/2013 | Lacy | ............... | F01D 5/183 416/97 R |
| 2014/0083639 A1 * | 3/2014 | Bonini | ............... | F01D 5/187 164/69.1 |
| 2014/0093392 A1 * | 4/2014 | Tibbott | ............... | F01D 5/189 416/97 R |
| 2014/0321994 A1 * | 10/2014 | Brzek | ............... | F01D 25/12 415/175 |

* cited by examiner

US 9,896,943 B2

GAS PATH COMPONENTS OF GAS TURBINE ENGINES AND METHODS FOR COOLING THE SAME USING POROUS MEDIUM COOLING SYSTEMS

TECHNICAL FIELD

The present invention generally relates to gas turbine engines and methods for cooling gas path components thereof, and more particularly relates to gas path components of gas turbine engines and methods for cooling the same using porous medium cooling systems.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary turbine vanes. The gas flow deflects off of the vanes and impinges upon blades of a turbine rotor. A rotatable turbine disk or wheel, from which the turbine blades extend, spins at high speeds to produce power. Gas turbine engines used in aircraft use the gas turbine aft end to produce a forward thrust. Other gas turbine engines may use the power to turn a propeller or an electrical generator. The gas turbine engine component comprising a wall with a wall surface configured to be exposed to the hot combustion gas flow during engine operation (i.e., a "gas path surface") and an opposing wall surface is referred to herein as a "gas path component."

One way to increase cycle efficiency, power density, and fuel efficiency of a gas turbine engine is to operate at higher turbine inlet temperatures (TIT). In most engines, the turbine inlet temperatures have increased well above the metallurgical limit of gas path components, making the gas path components (e.g., turbine nozzles and turbine blades and vanes) more susceptible to oxidation and thermo-mechanical fatigue. Film and impingement cooling of conventional gas path components are widely used techniques that allow higher turbine inlet temperatures by maintaining material temperatures within acceptable limits. For example, with film cooling, air may be extracted from the compressor and forced through internal cooling passages within the gas path component (e.g., a turbine blade) before being ejected through discrete film cooling holes onto an outer wall surface thereof (in this example, the gas path surface). The cooling air leaving these film cooling holes forms a film layer of cooling air on the outer wall surface, the film layer protecting the component from hot gas exiting the combustor by substantially reducing heat transfer from the hot gas to the gas path surface as the cooling air is at a lower temperature than the hot gas. Turbulence promoters and pin fins in a cooling medium flowpath through the component may also or alternatively be used to improve cooling. Although the aforementioned cooling techniques operate adequately, they may be improved for higher cooling effectiveness. Unfortunately, achieving a high heat transfer rate often involves large temperature gradients (that decrease component life) and complex geometries that are difficult and expensive to manufacture, using complex, fragile, and convectively augmented ceramic cores.

Accordingly, it is desirable to provide gas path components of gas turbine engines, such as turbine blade airfoils, and methods for cooling the same. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Gas path components of gas turbine engines are provided. In accordance with one exemplary embodiment, the gas path component comprises a wall at least partially defining a cooling plenum and a porous medium cooling system. The wall includes a wall surface comprising a gas path surface and an opposing wall surface proximate the cooling plenum. The porous medium cooling system is disposed between the cooling plenum and the opposing wall surface. The porous medium cooling system comprises a perforated baffle and a porous material layer disposed between and adjacent the perforated baffle and the opposing wall surface. The wall includes a plurality of openings in fluid communication with the cooling plenum via the porous medium cooling system.

Porous medium cooling systems for gas path components are provided in accordance with yet another exemplary embodiment of the present invention. The gas path component comprises a wall at least partially defining a cooling plenum. The porous medium cooling system comprises a perforated baffle and a porous material layer adjacent to and contacting the perforated baffle. The porous medium cooling system is configured to be disposed between the cooling plenum and the wall with the porous material layer disposed between the perforated baffle and the wall.

Methods are provided for cooling a gas path component in accordance with another exemplary embodiment of the present invention. The gas path component has a wall at least partially defining a cooling plenum. The wall includes a wall surface comprising a gas path surface and an opposing wall surface proximate the cooling plenum. A porous medium cooling system is formed on the opposing wall surface of the gas path component. The porous medium cooling system comprises a perforated baffle and a porous material layer disposed between and adjacent the perforated baffle and the opposing wall surface. A plurality of openings are formed in the wall of the gas path component, each opening having an outlet opening onto the gas path surface and the plurality of openings configured to be in fluid communication with the cooling plenum.

Furthermore, other desirable features and characteristics of the gas path component and the method for cooling the same using a porous medium cooling system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
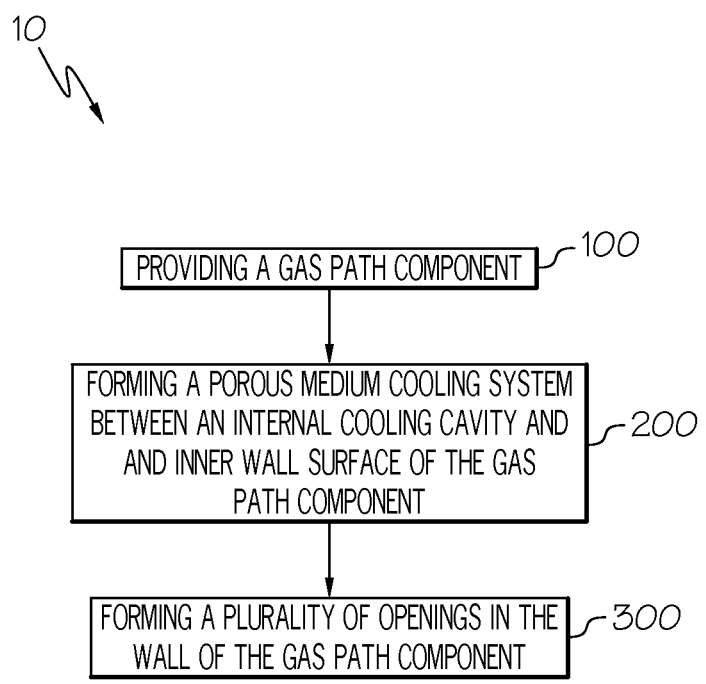
FIG. 1 is a flow diagram of a method for cooling a gas path component using a porous medium cooling system, according to an exemplary embodiment of the present invention.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to gas path components of gas turbine engines and methods for cooling the same using porous medium cooling systems. While this invention is being described showing a particular configured turbine blade as being the preferred embodiment, as one skilled in this art will appreciate, the principles of the present invention can be applied to other gas path components. A "gas path component" comprises a gas turbine engine component having a wall with a "hot" wall surface configured to be exposed to hot combustion gas flow during engine operation (hereinafter a "gas path surface") and an opposing "cold" wall surface. The opposing wall surface is "cold" as it is not exposed to the hot combustion gas, is adjacent the porous medium cooling system, and proximate a cooling plenum of the gas path component according to exemplary embodiments of the present invention as described herein. "Gas path components" include, for example, airfoils (stator vanes, rotor blades, etc.), turbine nozzles, combustors, etc. The gas path surface may be an outer wall surface (in which case the cooling plenum is an internal cooling plenum proximate the opposing inner wall surface. The gas path surface may alternatively be an inner wall surface (in which case the cooling plenum is an external cooling plenum proximate the opposing outer wall surface). For example, gas path surfaces include, for example, turbine blade skin, an outer wall surface of a turbine endwall, an inner wall surface of a combustor wall, etc. The porous medium cooling systems according to exemplary embodiments may be used to provide better cooling of the gas path component overall and of the gas path surface thereof, with less cooling medium, i.e., less cooling medium flow is needed to get to the same temperatures, thereby also decreasing specific fuel consumption (SFC). The porous medium cooling system also permits higher turbine inlet temperatures, and extends component life by reducing material temperatures and minimizing temperature gradients. Additionally, there is a reduced cost in manufacturing turbine blades, as expensive, complex and fragile conventional convectively augmented ceramic cores are no longer required.

Figure 2:
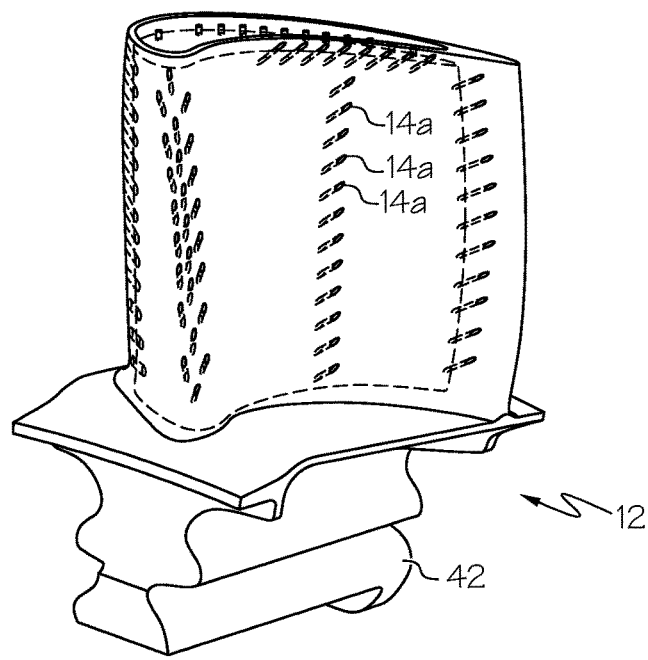
FIG. 2 is an isometric view of an exemplary prior art turbine blade with film cooling holes in an exemplary pattern.
Figure 3:
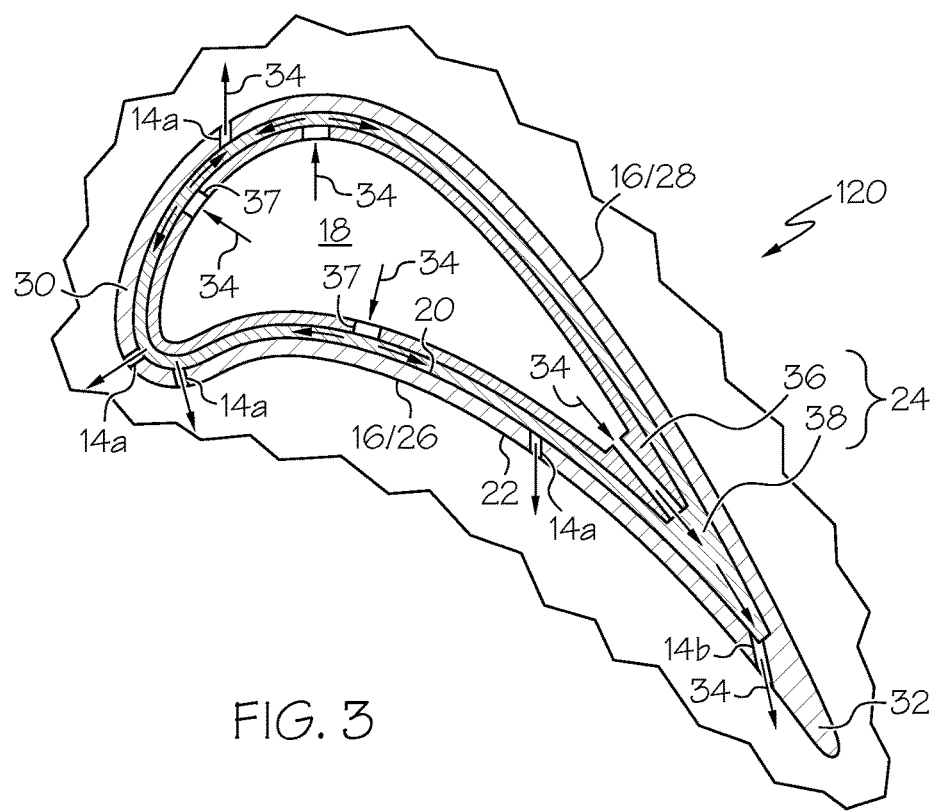
FIG. 3 is a cross-sectional view of a gas path component (an exemplary turbine blade including an airfoil) with a porous medium cooling system, according to another exemplary embodiment of the present invention.

Referring now to FIGS. 1 and 3, according to exemplary embodiments, a method 10 for cooling a gas path component begins by providing a gas path component (step 100) (exemplified by the conventional turbine blade 12 with film cooling holes 14a illustrated in FIG. 2). While film cooling holes 14a are depicted in the gas path component, it is to be understood that the gas path component provided may have the film cooling holes 14a formed in a later step (e.g., step 300). The gas path component 12 may be manufactured by a traditional manufacturing methodology, such as by casting. Gas path components 120 including porous medium cooling systems in accordance with exemplary embodiments of the present invention as described herein may be manufactured by casting or by additive manufacturing, as hereinafter described.

Still referring to FIG. 3, a cross-sectional view through a turbine blade 120 (an exemplary gas path component) with a porous medium cooling system 24 in accordance with one embodiment of the present invention is shown. The gas path component comprises a wall 16 and a cooling plenum 18 at least partially defined by the wall 16. The wall has an inner surface ("an inner wall surface") 20 and an outer surface ("an outer wall surface") 22. In the depicted embodiment, the inner wall surface 20 is the opposing "cold" wall surface and the outer wall surface 22 is the gas path surface configured to be exposed to hot combustion gas. The wall comprises a portion of a body of the gas path component 12 and may be comprised of a metal or metal alloy, such as a nickel alloy (e.g., Inconel® alloys), etc. While nickel alloys are conventionally used in manufacturing gas path components, such as turbine blades, it is to be understood that other materials may be used for the gas path component.

The turbine blade 120 includes pressure and suction sidewalls 26 and 28 defining the wall 16 joined at respective leading and trailing edges 30 and 32, such that a major portion of the turbine blade is hollow. The terms "a leading edge" and "a trailing edge" are used respectively herein to describe the foremost and rear edges of an airfoil section of a turbine blade. Cooling plenum 18 is at least partially defined by the sidewalls 26 and 28. Sidewalls 26 and 28 each have the inner wall surface 20 and the outer wall surface 22. While the outer wall surface comprises the gas path surface in the depicted embodiment, it is to be understood, as noted previously, that the inner wall surface may comprise the gas path surface (such as in a combustor).

Method 10 for cooling the gas path component, according to exemplary embodiments of the present invention, continues by forming the porous medium cooling system 24 between the cooling plenum 18 and the opposing wall surface (the inner wall surface 20 in the depicted embodiment) of the gas path component (step 200). The porous medium cooling system 24 comprises a perforated baffle 36 (FIGS. 3 and 4) and a porous material layer 38 (FIGS. 3, 5, and 6) disposed between and adjacent the perforated baffle and the inner wall surface 20. The three layers, the perforated baffle, the porous material layer, and the wall may be bonded together by methods well known in the art, such as by brazing, by using a bond coat layer as hereinafter described, etc. The porous material layer 38 is sandwiched between the perforated baffle 36 and the opposing wall surface 20 of the gas path component (FIG. 3). In addition to providing an increased heat transfer area and increased tortuous turbulence intensity through the tortuous flow passages as hereinafter described, the large temperature peaks and gradients associated with conventional cooling systems are reduced through the enhanced combination of conduction and convection, allowing for more uniform cooling. The cooling medium 34 (indicated by arrows in FIG. 3) is forced to flow through the porous material layer 38, increasing the level of turbulence and, at the same time, the "heat bridges" as hereinafter described are cooled while conducting heat from the opposing wall surface (the inner wall surface 20 in the depicted embodiment) to the perforated baffle 36. The cooling medium 34 may be air or another coolant.

To form the porous medium cooling system 24 in the gas path component 12, the porous material layer 38 may be formed in a hollow cast of the gas path component (i.e., a hollow body of the gas path component). In one embodiment, the porous material layer 38 is formed on the inner wall surface 20 of the hollow cast. The porous material layer 38 comprises a porous metallic foam (FIG. 5) that is shaped to conform to at least a portion of the inner wall surface 20 of the hollow gas path component. The porous material layer 38 comprises a low density permeable material with a porosity of about 75 to about 95% of the volume consisting of void spaces and a thermal conductivity that is at least the thermal conductivity of the gas path component material (e.g., metals or metal alloys such as Inconel® nickel alloys). For example, when using a nickel alloy, the thermal conductivity of the porous material layer (and the perforated baffle) is preferably at least about 10 btu/hr-ft-° F., although a porous material with less porosity and higher thermal conductivity may be used. Suitable exemplary porous material includes metallic foams, such as nickel foam available from, for example, Selee Corporation, Hendersonville, N.C. (U.S.A.), although other metal-based porous materials may be used. Suitable metals or metal alloys for the porous material layer are those that may be joined metallurgically to the perforated baffle and component wall. A ceramic-based porous material may be used if its thermal conductivity is comparable to that of a metal. The pore size may be greater than about 0.010 inches, or about 70 parts per inch (ppi), although the pore size may vary depending upon the application. The pore size is selected to avoid blockage of the pore(s) by possible foreign material in the cooling medium.

The porous material layer 38 acts as a "heat bridge" between the gas path surface of the gas path component that is exposed to the hot gas and the cooling plenum 18. In addition, the porosity of the porous material increases the heat transfer area and turbulence intensity, thereby enhancing heat removal. The enhanced heat transfer is achieved by the increased heat transfer area and the increased turbulence intensity through the tortuous flow passages in the porous material. The porous material layer 38 is separated and protected from the hot combustion gas by the solid wall 16 (e.g., sidewalls 26 and 28) of the gas path component.

As noted previously, the porous medium cooling system 24 may further comprise a bond coating layer between the perforated baffle 36 and the porous material layer 38 and/or between the porous material layer 38 and the opposing wall surface (the inner wall surface 20 in the depicted embodiment). Use of the bond coating layer improves the structural integrity of the gas path component. An exemplary suitable bond coating includes a nickel-boron bond coating or the like. The gas path component 12 may further comprise a thermal barrier coating (not shown) on the gas path surface, depending upon the temperature of the hot gas and the application. The gas path surface may need to be masked, if an environmental coating or thermal barrier coating is already disposed on the gas path surface.

Figure 4:
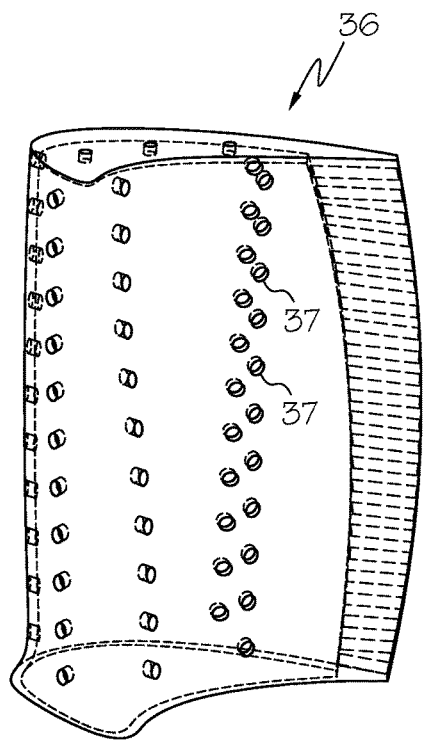
FIG. 4 is an isometric view of an exemplary perforated baffle of the porous medium cooling system according to exemplary embodiments of the present invention.
Figure 5:
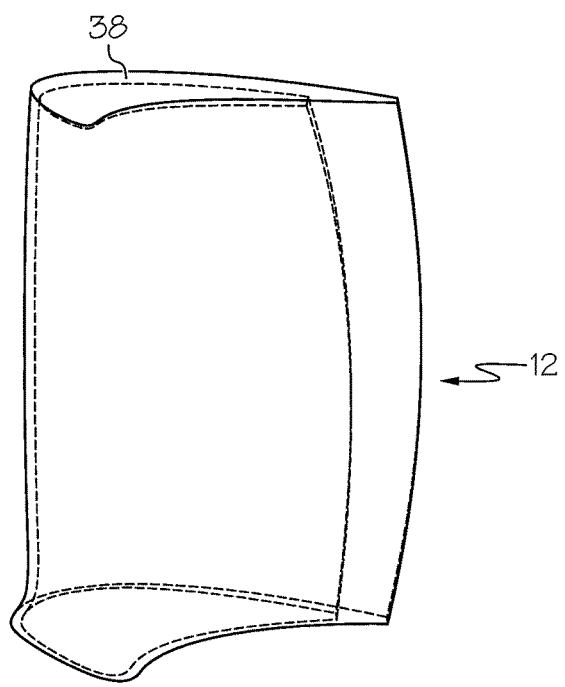
FIG. 5 is an isometric view of an exemplary porous material comprising a metallic foam of the porous medium cooling system according to exemplary embodiments of the present invention.

Next, the perforated baffle 36 (FIG. 4) is inserted between the cooling plenum 18 and the porous material layer 38. The perforated baffle 36 may be coated with the bond coating layer (not shown) on an outer surface thereof to achieve a good mechanical and thermal bond with the porous material layer. The perforated baffle may be a tube, a plate, or another standalone structural member with a plurality of perforations 37. The perforated baffle may be a single wall structure. Once the gas path component 12 including the porous medium cooling system 24 is assembled, the porous material layer 38 is disposed between and adjacent the perforated baffle 36 and the opposing wall surface (the inner wall surface 20 in the depicted embodiment) of the gas path component 12. The perforated baffle 36 may comprise a metal alloy, such as a nickel alloy (e.g., Inconel® alloys). The perforations 37 in the perforated baffle comprise transfer openings that permit cooling medium flow from the cooling plenum, through the perforations 37, into the porous material layer 38, and out through the plurality of openings (e.g., film cooling holes 14a) in the wall 16 (e.g., sidewalls 26 and 28 of exemplary turbine blade) of the gas path component onto the gas path surface (the outer wall surface 22 in the depicted embodiment), as hereinafter described. The position and number of perforations in the perforated baffle may be optimized to achieve the best cooling effectiveness. The perforations may be spaced in one or both of the streamwise and spanwise directions, for transferring the cooling medium against the porous material layer. The perforations depicted in the perforated baffle of FIG. 4 are exemplary only.

Figure 7:
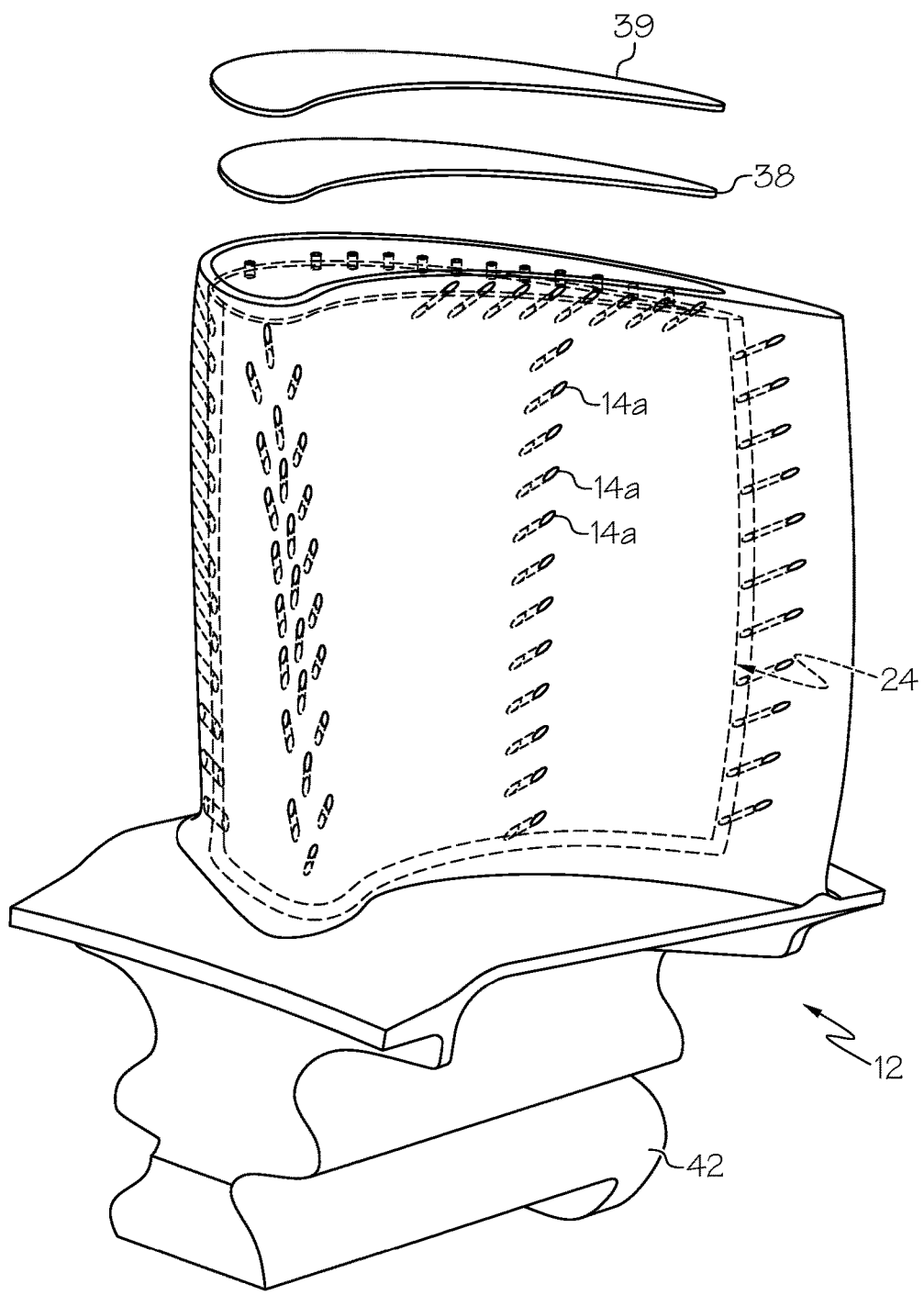
FIG. 7 is a partially expanded schematic perspective view of an exemplary turbine blade including the porous medium cooling system of FIG. 3, in which an additional layer of the porous material and a tip cap are expanded from the turbine blade.

For turbine blades, with reference to FIG. 7, the layer of porous material 38 may additionally be placed over the perforated baffle 36 for tip cooling. A tip cap 39 may then be connected to the blade body, such as by welding or the like. In the case of a turbine blade, the tip may be initially open to form the porous medium cooling system 24 therein. For example, the gas path component may be open on at least one end thereof for inserting the perforated baffle 36 in the hollow cast (FIG. 4). After formation of the porous medium cooling system, the tip of the turbine blade may be sealed by the tip cap 39 or the like.

While the forming of a porous medium cooling system 24 between the cooling plenum 18 and the opposing wall surface has been described, it is to be understood that the porous medium cooling system may be disposed at only a portion of the gas path component. For example, the porous medium cooling system may be disposed at only the leading edge of gas path components such as turbine blades, at the trailing edge, or both.

Referring again to FIG. 1 and to FIG. 3, according to exemplary embodiments, the method 10 for cooling a gas path component continues by forming a plurality of openings 14a and/or 14b in the wall 16 of the gas path component (step 300). Each opening of the plurality of openings has an inlet configured to receive cooling medium 34 from the cooling plenum 18 via the porous medium cooling system 24 and an outlet opening onto the gas path surface of the gas path component. The plurality of openings in the wall of the component comprise a plurality of film cooling holes 14a, a plurality of trailing edge slots 14b in the wall 16 at the trailing edge of the turbine blade or other gas path component, or both. The plurality of openings is configured to be in fluid communication with the cooling plenum 18. The plurality of openings in the wall of the gas path component are ideally formed after bonding of the porous material layer to the wall of the gas path component to avoid blocking the plurality of openings. The openings can additionally or alternatively be pre-cut (i.e., prior to or simultaneously with the step of providing the gas path component) if no bonding is performed. The position and number of openings in the wall of the component may be optimized to achieve the best cooling effectiveness and to target the high-heat flux areas such as the leading edge of the gas path component, such as the turbine blade.

In an alternative embodiment, as noted previously the gas path component comprising the porous medium system may be manufactured as a one-piece monolithic structure by an additive manufacturing process. Additive Manufacturing (AM) is defined by the American Society for Testing and Materials (ASTM) as the "process of joining materials to make objects from 3D model data, usually deposit layer upon deposit layer, as opposed to subtractive manufacturing methodologies, such as traditional machining and casting." Some examples of additive manufacturing processes include: direct metal laser sintering (DMLS) technology; micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing processes provide flexibility in free-form fabrication without geometric constraints, fast material processing time, and innovative joining techniques. The material used for manufacturing the additive-manufactured gas path component may be a material that has superior thermo-mechanical properties and is deemed suitable for use in a gas turbine engine with high gas temperatures. For example, the additive-manufactured gas path component including the porous medium cooling system may be built in "strata" (layers), each being a slice of a solid 3D CAD model that contains the information to delineate the openings, pores, perforations, etc. of the porous medium cooling system. A three-dimensional printing technique may alternatively be used to manufacture the gas path component with a porous medium cooling system.

Figure 6:
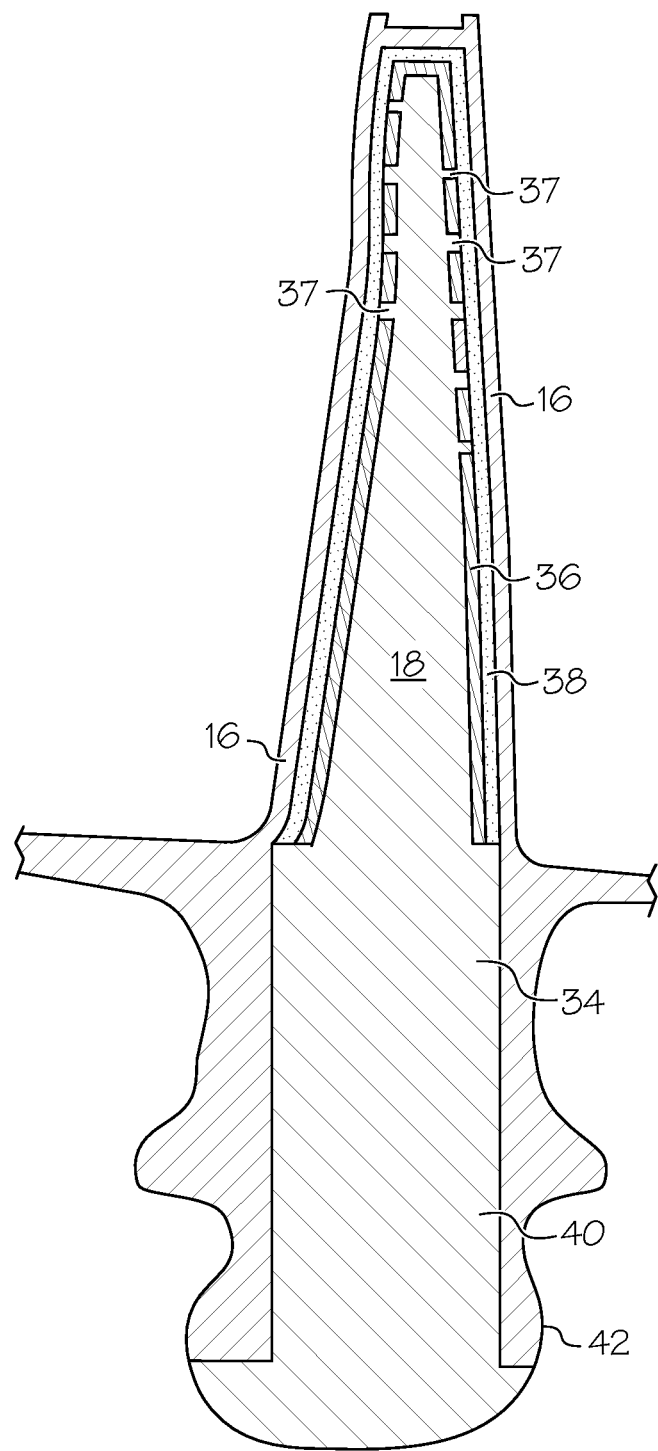
FIG. 6 is an isometric view of an exemplary turbine blade with a porous medium cooling system according to exemplary embodiments of the present invention, the cooling plenum within the turbine blade depicted as receiving cooling medium from a passage in a fir tree attachment of the turbine blade.

In operation, the cooling medium 34 (air or another coolant) is supplied from a cooling medium source (not shown) into the cooling plenum 18 of the gas path component (exemplified by the turbine blade 120 of FIG. 3). The cooling medium 34 then flows through the perforations 37 in the perforated baffle 36 and is distributed substantially throughout the porous material layer 38, before exiting through the outlets of the plurality of openings 14a and/or 14b onto the gas path surface (again, the outer wall surface 22 in the exemplary turbine blade) of the gas path component. The path taken by the cooling medium is referred to herein as a "cooling medium flowpath." A portion of the cooling medium flowpath is shown in FIG. 6. For example, cooling medium may be discharged through the plurality of film cooling holes 14a forming a film layer of cooling medium on the gas path surface of the gas path component. As known in the art, and depicted in FIG. 6, the cooling medium 34 may be supplied to the cooling plenum 18 of a turbine blade from a passage 40 formed in the bottom of a fir tree attachment 42 and as is typical in many turbine cooling installations, the cooling medium may be supplied by the engine compressor (not shown). There may be turbulence promoters and pin fins (not shown) in the cooling medium flowpath through the gas path component.

From the foregoing, it is to be appreciated that gas path components and methods for cooling the same using porous medium cooling systems have been provided. The porous medium cooling systems provide improved cooling of the gas path components (overall cooling of the component and cooling of the gas path surfaces) exposed to a hot combustion gas flow, permitting higher turbine inlet temperatures, and extending component life. The heat transfer between the hot combustion gas flow and the cooling medium is enhanced as is the distribution of cooling medium from the cooling plenum to the gas path surface, thereby reducing cooling medium flow and resulting in less fuel consumption.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for cooling a gas path component comprising a wall at least partially defining a cooling plenum, the wall having a wall surface comprising a gas path surface and an opposing wall surface proximate the cooling plenum, the method comprising the steps of:

forming a porous medium cooling system in the gas path component by:
        applying a first bond coating layer in a hollow cast of the gas path component on the opposing wall surface, the hollow cast of the gas path component having at least one open end;
        applying a low density porous metallic foam in the hollow cast of the gas path component, the low density porous metallic foam having a porosity of about 75% to about 95% of the volume consisting of void spaces;

bonding the porous material layer to the opposing wall surface by the first bond coating layer;

applying a second bond coating layer to an outer surface of a tubular perforated baffle;

inserting the perforated baffle into the at least one open end of the hollow cast such that the perforated baffle is positioned between the cooling plenum and the porous metallic foam;

bonding the porous metallic foam to the perforated baffle by the second bond coating layer such that the porous metallic foam is bonded to the perforated baffle substantially over a perimeter of the baffle; and after bonding the porous material layer to the opposing wall surface, forming a plurality of openings through the wall of the gas path component, each opening having an outlet opening onto the gas path surface and the plurality of openings having an inlet in fluid communication with the porous metallic foam to receive cooling medium for cooling the gas path component.

2. The method of claim 1, wherein the forming the plurality of openings comprises forming a plurality of film cooling holes.

3. The method of claim 1, wherein the forming the plurality of openings comprises forming a plurality of film cooling holes, a plurality of trailing edge slots at the trailing edge of the turbine blade, or both film cooling holes and trailing edge slots.

4. The method of claim 1, wherein the gas path component comprises a turbine blade having a body that defines the wall, the method further comprising the step of:

applying an additional porous metallic foam layer over a first open end of the perforated baffle for tip cooling; and connecting a blade tip cap to the body to seal the at least one open end after the forming and positioning steps.

* * * * *